United States Patent [19]

Tsuchiya et al.

[11] 4,086,753

[45] May 2, 1978

[54] TIMEPIECE

[75] Inventors: Hideo Tsuchiya, Matsudo; Kiyoshi Kitai, Tokyo, both of Japan

[73] Assignees: Kabushiki Kaisha Seikosha; Seiko Koki Kabushiki Kaisha; Suwa Seikosha, all of Japan

[21] Appl. No.: 688,993

[22] Filed: May 24, 1976

[30] Foreign Application Priority Data

May 23, 1975 Japan ................................ 50-62183

[51] Int. Cl.[2] ......................... G04C 3/00; H02K 7/08; H02K 7/10

[52] U.S. Cl. ............................. 58/23 D; 310/40 MM; 310/83

[58] Field of Search ................. 29/177, 596; 58/23 R, 58/23 D; 310/40 MM, 83

[56] References Cited

U.S. PATENT DOCUMENTS

| | | | |
|---|---|---|---|
| 3,652,884 | 3/1972 | Vuffray | 58/23 D X |
| 3,796,039 | 3/1974 | Lucien | 58/23 D |
| 3,898,789 | 8/1975 | Arzi et al. | 58/23 R |
| 3,943,695 | 3/1976 | Bauer et al. | 58/23 D |
| 3,978,651 | 9/1976 | Yoshino | 58/23 D |

*Primary Examiner*—Stanley J. Witkowski
*Attorney, Agent, or Firm*—Robert E. Burns; Emmanuel J. Lobato; Bruce L. Adams

[57] ABSTRACT

A timepiece including two base plates opposite each other and defining a space therebetween, and having a gear train and an electro-mechanical converter for driving the gear train and both disposed in the space between the two base plates. The converter includes a stator comprised of a platelike member defining an intermediate plate portion positioned in the space between the two base plates. The intermediate plate portion supports gear train components and is isolated magnetically from the rest of the stator.

6 Claims, 4 Drawing Figures

TIMEPIECE

BACKGROUND OF THE INVENTION

This invention relates to a timepiece mechanism.

Conventional timepieces such as for example motor driven type timepieces have essentially required a relatively large internal space for the timepiece movement, and this has been an obstacle to miniaturization of the timepiece.

SUMMARY OF THE INVENTION

This invention incorporates a novel arrangement of the stator designed to double as a center or intermediate plate for supporting the timepiece movement to realize a decrease of the number of necessary parts and miniaturization of the timepiece as a whole as well as a significant reduction of the manufacturing cost.

The invention is now described in detail by way of an embodiment thereof with reference to the accompanying drawings.

DESCRIPTION OF THE PREFERRED EMBODIMENT

Figure 1:
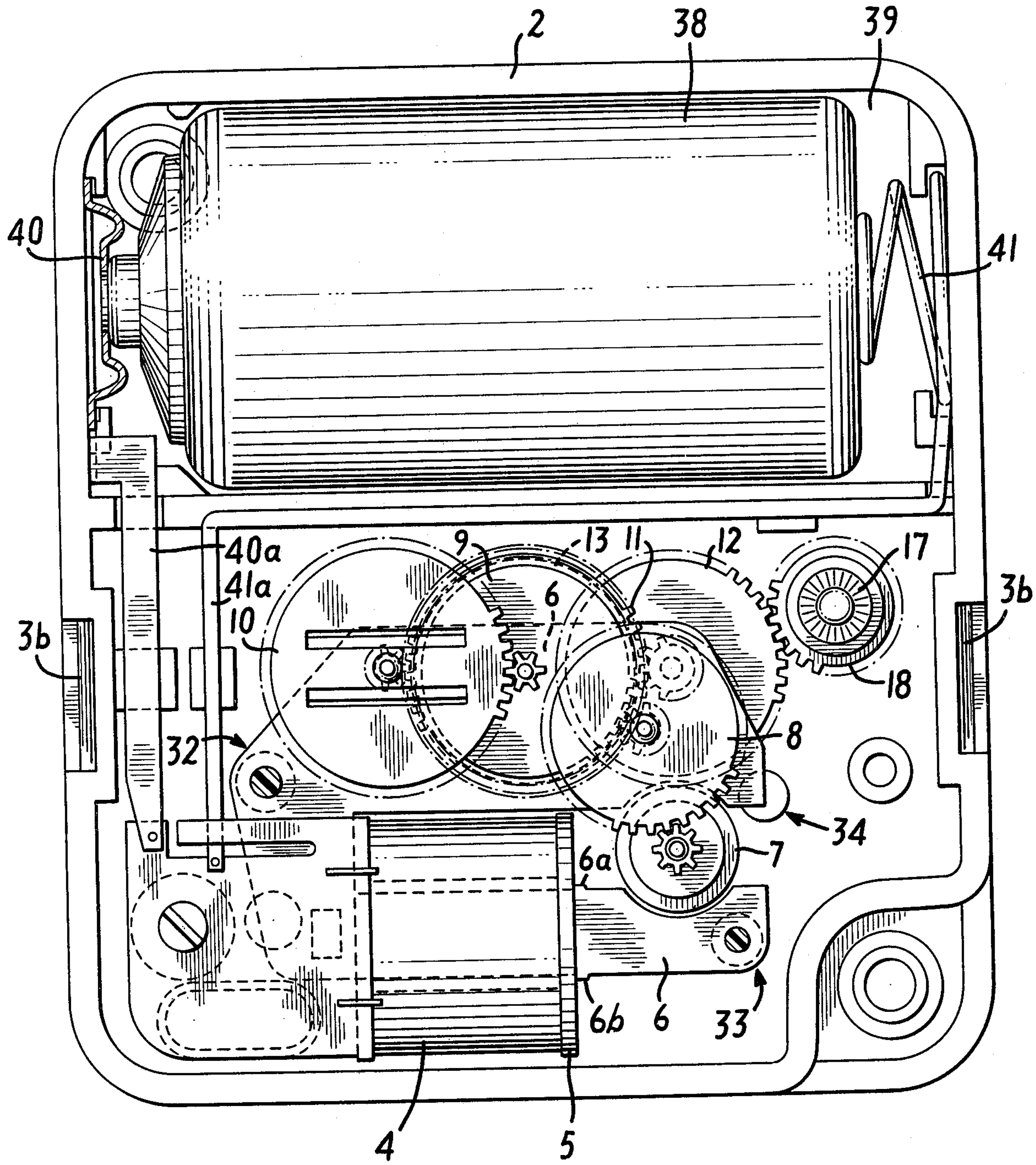
FIG. 1 is a plane view of a timepiece according to the present invention with one base plate removed.
Figure 2:
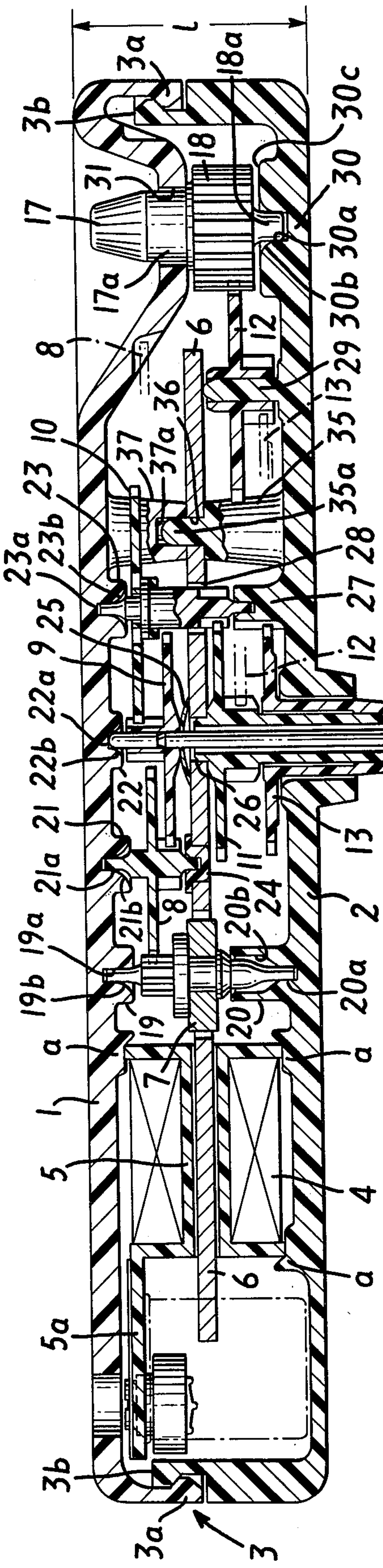
FIG. 2 is a sectional view of the timepiece according to the present invention.

Referring first to FIGS. 1 and 2 of the drawings, there are shown, as designated by numerals 1 and 2, the base plates having integrally molded therewith the support portions designed for positioning the bearings for the wheel clusters and other parts. Formed at the sides of these two base plates 1, 2 are the engaging portions **3*a* and the corresponding engaged portions 3*b* whereby said base plates are elastically combined together to form a case. Said engaging and engaged portions 3*a* and 3*b* are formed with taper portions which provide a certain latitude for joining of the two base plates 1, 2 to prevent vertical looseness when they are joined together. The base plates 1, 2** may be made of a synthetic resin material such as, for example, polycarbonate resin, fluorine-contained polycarbonate resin, glassfiber-reinforced polyester resin, denatured polyphenylene oxide resin, etc., or a metal material such as for example aluminum diecast. But these materials may be substituted by other material which can provide sufficient mechanical strength for use as base plates as well as satisfactory friction and wear resistance for use as bearings.

It will be seen that a coil 4 is wound on a bobbin 5 which is mounted on a stator 6. The stator 6 may be formed integrally by press-cutting a plate of a magnetic material such as a silicone steel plate into a U-shaped element. This element is designed to perform not only its primary function associated with the motor but to also serve as a center plate for the movement. The bobbin 5 is inserted from an end of the stator 6 against the projections **6*a*, 6*b* formed on the stator. Shown in the drawings is the inserted condition with the end of the bobbin 5 secured in place by said projections 6*a*, 6*b*. Although the stator 6 is formed from a single sheet of plate in the shown embodiment, it may be made from a lamination of several sheets of plate of the same configuration. The ends of the bobbin 5 are secured by the protuberant supporting portions a formed integrally on the base plates 1, 2 and are also adapted to serve as spacers between both base plates 1, 2**.

Formed on a support plate **5*a* extending out integrally from one end of the bobbin 5 is a circuit pattern incorporating various circuit parts such as a quartz oscillator, integrated circuit, trimmer, etc. For constructing such circuit assembly on the support plate 5*a*, a printed circuit board already mounted with necessary circuit parts may be bonded to the support plate 5*a***.

A rotor 7 is meshed with a second wheel 9 through a 2nd or center wheel 8, and said second wheel 9 further meshed with a minute wheel 11 through an intermediate wheel 10. Said minute wheel 11 is also meshed with an hour wheel 13 via an intermediate wheel 12. Numeral 14 designates a second wheel arbor secured to the second wheel 9, 15 a minute wheel pipe formed integral with the minute wheel 11, and 16 an hour wheel pipe formed integral with the hour wheel 13. Also meshed with the intermediate wheel 12 are a hand setter 17 and a hand setter pinion 18 integral therewith. In this embodiment of the invention, all the parts of the mechanism, except for the motor, electric parts and second wheel arbor 14, are made of a synthetic resin material.

Figure 3:
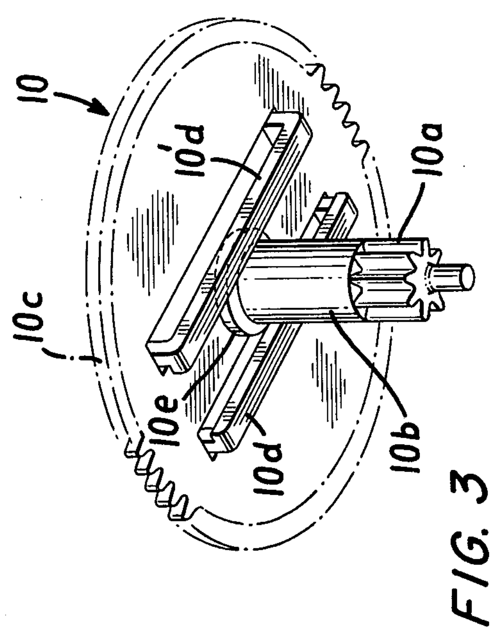
FIG. 3 is a perspective view of an element of the timepiece mechanism.

In connection with the above-mentioned wheel clusters, the arrangement of the intermediate wheel 10 is here described in further detail with particular reference to FIG. 3. This intermediate wheel 10 consists of a shaft **10*b* on which an intermediate pinion 10*a* is formed integrally, and an intermediate gear 10*c*. On the back side of said intermediate gear 10*c* are symmetrically provided a pair of protuberant elastic engaging members 10*d*, 10'*d*. These two elastic engaging members 10*d*, 10'*d* are spaced from each other a distance which is slightly smaller than the outer diameter of the intermediate wheel shaft 10*b* so that the opposing sides of the engaging members 10*d*, 10*d* are pressed elastically against the corresponding sides of the shaft 10*b* at a predetermined slip torque, whereby during the normal hand movement both intermediate gear 10*c* and shaft 10*b* are turned integrally by the frictional force developed therebetween. But when the hand is turned intentionally, the transmission of rotation between said gear 10*c* and shaft 10*b* is cut off. The portions of said elastic engaging members 10*d*, 10'*d* contacting the shaft 10*b* may be shaped arcuately. The slip torque is determined depending on the size (length, thickness and width) of each elastic engaging member 10*d*, 10'*d*, outer diameter of the shaft 10*b* and distance between the opposing sides of said engaging members, and hence the configurations of these parts are suitably decided according to the purpose of use. At the top end of the shaft 10*b* is formed an enlarged portion 10*e* which is securely engaged with the elastic engaging members 10*d* 10'*d*** to prevent accidental removal of the shaft.

Now the supporting mechanism for said wheel clusters and other parts is described. Said wheel clusters are supported by the base plates 1, 2 serving as the case or by utilizing a part of the stator 6. There are also provided washers adapted to allow easy insertion of the parts while preventing fall-down thereof when assembling said wheel clusters automatically by using, for example, an automatic assembling device.

Also formed integral with the base plates 1, 2 are support members 19, 20 designed to support the rotor 7. The support member 20 comprises a washer **20*a*** adapted to support the pivot of the rotor shaft, and a pipe-shaped portion 20b formed axially and integral with said washer. The pipe-shaped portion 20b is so designed that it can hold the rotor 7 in a fixed position by its inner peripheral edge even when the base plate 1 is not yet set in position. It also acts to keep the rotor 7 apart from the stator 6 when the rotor 7 has tilted to the limit. This arrangement permits easy fitting of the base plate 1 as it can maintain a certain given posture of the rotor after setting thereof at the support portion 20 until completion of joining of the base plate 1 in the automatic assembling operation. Another support member 19 comprises a washer 19a and a convex guide portion 19b shaped integral therewith. Said guide portion 19b is designed to guide the pivot of the rotor shaft smoothly to the washer 19a even if said shaft should be slightly slanted during mounting of the base plate 1.

The support members 21, 22 and 23 also provided on the base plate 1 for pivotally supporting the center wheel 8, second wheel arbor 14 and intermediate wheel 10, respectively, and are substantially of the same construction as the above-described support member 19, and each of these support members comprises a washer 21a, 22a, 23a and a guide portion 21b, 22b, 23b, which are all identical with those already described. The other end of the center wheel 8 is supported by a synthetic resin bearing bush 24 press-fitted into the stator 6. Said shaft may be supported directly by the stator 6 without medium of the bearing bush 24. In the latter case, it is desirable for obtaining better lubricating properties to form an oil groove in the stator 6 with, for example, an oilless matal. The lower end face of the second wheel 9 is supported by a spring washer 25, and the second wheel arbor 14 is elastically pressed against the washer 22 with a contact pressure by the elastic force of said spring washer 25 effective to prevent breathing of the second hand (not shown). The top end of the minute wheel 11 is supported in a hollow portion 26 formed in the stator 6.

The support member 27 supporting the other end of the shaft of the intermediate wheel 10 is substantially of the same construction as the support member 23, but the intermediate wheel 10 is supported in a hollow portion 28 of the stator 6 against falling after setting on the support member 27 (with the base plate 1 being not yet set in place). Another intermediate wheel 12 is rotatably supported by a stem-like portion 29 formed integral with and projecting from the base plate 2. It is secured against removal by the lower end face of the stator 6 as the latter is set in its position. Said stem-like portion 29 also serves for positioning of the stator 6. The support member 30 for pivotally supporting the hand turning pinion 18 comprises a support portion 30a adapted to support the pivot 18a of said pinion 18, an open guide portion 30b formed integral therewith, and a protuberance 30c with a flat top. The underside of the hand turning pinion 18 is supported by the flat top surface of the protuberance 30c so that the former won't fall down when the base plate 1 is not yet mounted in position. When the base plate 1 is set in place, said hand turning pinion 18 has its shaft portion 17a supported and held in a prescribed position in a hollowed portion 31 of the base plate 1 forming a curved recession.

Now the supporting mechanism for the stator 6 which doubles as the center plate is described. It will be seen that the stator 6 is supported by the support members 32, 33 and 34 and a stem-like protuberance 29. The support members 32 and 33 are the same in construction, and as shown in FIG. 2, a small projection 35a from a frusto-conical support post 35 formed integral with the base plate 1 in projection therefrom passes through a hole 36 formed in the stator 6 and then fits in a hole 37a formed in another frusto-conical support post 37 projecting from the base plate 2, thereby supporting the stator by pressing it in the vertical direction on one side each of said support posts 35 and 37. The support member 34 is of a type in which it is merely held by support posts (not shown) projecting from the base plates 1 and 2. The support posts 35 and 37 function both as fixing means for the stator 6 and as spacers between the base plates 1 and 2.

The base plate 2 has also formed integral therewith a housing 39 for a cell 38, and a positive connection terminal 40 and a negative connection terminal 41 are provided at both ends thereof. Extending from an end of said positive connection terminal 40 is a strip-shaped bent tongue 40a which is welded at its end to a power supply terminal of the circuit pattern on the support plate 5a. On the other hand, one end portion 41a of the negative connection terminal 41 extends along the external wall surface of the cell housing 39 and is bent at a suitable part and connected at its end to the power supply terminal on the support plate 5a.

As for the size of the device according to the instant embodiment of this invention, the thickness or distance between the upper side of the base plate 1 and the lower side of the base plate 2, in one example, is 17mm. This represents an extremely small thickness for a timepiece including the clock case. Such small thickness was realized by integrated construction of the base plates and case and the novel arrangement of the stator doubling as a center plate.

In operation of the above-described timepiece of this invention, when the rotor 7 is driven by the driving output of the quartz oscillator, the second wheel 9 is turned through the medium of the center wheel 8 to make one full rotation in one minute, while the minute wheel 11 is turned through the medium of the intermediate wheel 10 to make one full rotation in one hour, and likewise the hour wheel 13 is turned through the medium of the intermediate wheel 12 to make one full rotation in 12 hours, thus making correct time indications.

For making correction of the hand position, one may simply turn the hand setting knob 17, whereby the intermediate wheel 12 is turned through turning of the hand turning pinion 18, causing a corresponding turn of the minute wheel 11 and hour wheel 13 to effectuate a desired hand correction. In this case, the intermediate pinion 10a and the integral intermediate wheel shaft 10b shown in FIG. 3 are turned in correspondence to a turn of said minute wheel 11, but the elastic engaging members 10d in the intermediate gear 10c and the shaft 10b slip relative to each other at their frictional contact faces and hence the hand turning motion is not transmitted to the succeeding wheel clusters.

Figure 4:
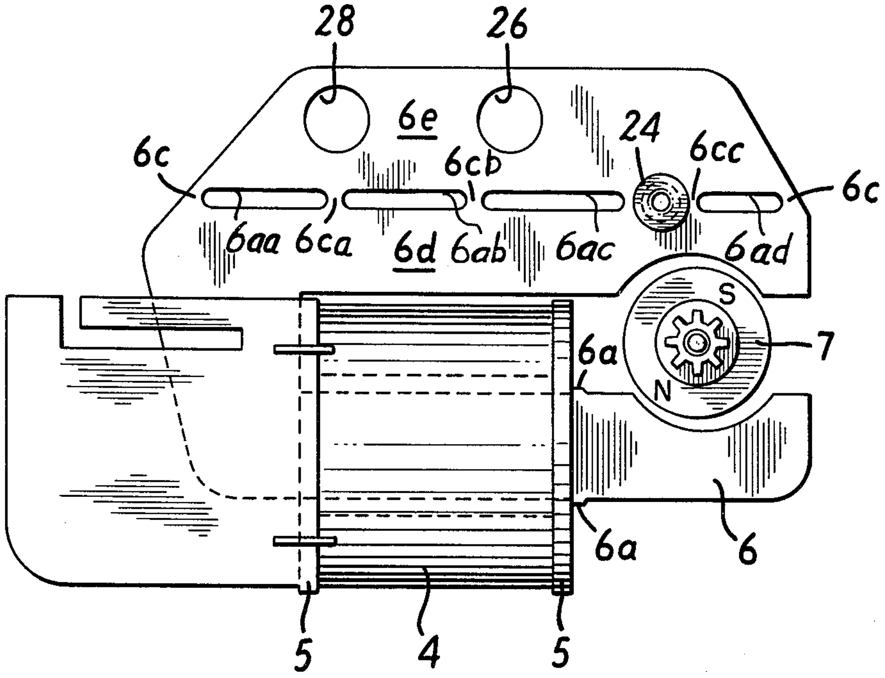
FIG. 4 is a plane view illustrating a stator used in the timepiece according to the present invention.

In this embodiment, it is possible to prevent deposition of iron powder and dust on the wheel bearings and other parts in the stator 6 by changing the distribution of the magnetic flux by forming a hole in the stator 6. This mechanism is here described with reference to FIG. 4 where the same reference numerals as used in FIGS. 1 and 2 designate the same parts. It will be seen that slots 6aa – 6ad are formed in the stator 6. When the coil 4 is excited, the magnetic flux produced in the stator 6 passes through the magnetic path 6d, 6e to reach the rotor 7, but due to presence of the holes *6aa* – *6ad*, the magnetic resistance at the portions *6ca* – *6cc* of the stator 6 is increased, causing most of the produced magnetic flux to pass through the magnetic path *6d*. If the holes *6aa* – *6ad* are not present, the magnetic pathes *6d*, *6e* are magnetized uniformaly to cause adsorption and deposition of iron powder, etc., on the bearings and other parts, resulting in troubles such as retardation of rotation of the gears. The present device, however, is perfectly free of such problem as the magnetic flux to the magnetic path *6e* is confined to a minimum.

Thus, according to the present invention, as the stator is adapted to not only perform its primary function but also serve as a center plate for the timepiece movement, it is possible to realize a decrease of the number of necessary parts and miniaturization of the timepiece, particularly thinning thereof, as well as improvement of the ease of assembly and reduction of the manufacturing cost. Also, even in case the wheel clusters, etc., are supported by the stator, the bearing holes and such can be formed simultaneously with press-cutting of the stator, so that if the bearings are set in position prior to the assemblage, the assembling work is greatly facilitated. Further, it is possible to regulate the axial movement of the gears rotatably mounted on the stem-like portions projecting from the base plates by utilizing said stator and to also regulate the height of the stator by said stem-like portions. Moreover, it is possible to prevent casual falling of the wheel clusters in the course of assemblage by use of the holes formed in the stator. This proves to be quite helpful for the assembling work, particularly in an automatic assembling operation.

What is claimed is:

1. In a timepiece, the combination comprising: two base plates opposite each other and defining a space therebetween; a gear train comprised of gear wheels and disposed in the space between said base plates; and electro-mechanical converter means responsive to electrical signals for driving said gear train and disposed in the space between said base plates, wherein said converter means is comprised of a stator, a rotor positioned opposite said stator, and means for magnetizing said stator to effect rotation of said rotor, and wherein said stator is comprised of a plate-like member defining an intermediate plate portion positioned in the space between said base plate and supporting at least a gear wheel of said gear train.

2. In a timepiece according to claim 1, wherein one of said base plates includes an axial shaft projecting therefrom and having a gear wheel mounted thereon for rotation, and said intermediate plate is effective to define a limit to an axial position of said gear wheel.

3. In a timepiece according to claim 1, wherein said intermediate plate includes at least one hole at a position to effectuate positioning of a gear train gear wheel arbor during assembly of the timepiece, and said plate supports components of said gear train after assembly of the timepiece is complete.

4. In a timepiece according to claim 1, wherein said stator has at least one hole therethrough at a position effective to substantially isolate magnetically said intermediate plate portion from the rest of said stator.

5. In a timepiece according to claim 1, wherein said means for magnetizing is comprised of a coil wound around the rest of said stator for receiving electrical signals to magnetize the rest of said stator.

6. In a timepiece, the combination comprising: two base plates opposite each other and defining a space therebetween; a gear train comprised of gear wheels mounted for rotation on arbors and bearings and disposed in the space between said base plates; and electro-mechanical converter means responsive to electrical signals for driving said gear train and disposed in the space between said base plates, wherein said converter means is comprised of a stator, a rotor positioned opposite said stator, and means for magnetizing said stator to effect rotation of said rotor, and wherein said stator is comprised of a plate-like member defining an intermediate plate portion positioned in the space between said base plates and supporting a bearing of a gear train gear wheel arbor.

* * * * *